T. WARKER.
Apparatus for Drawing Effervescent Liquid.
No. 8,200. Reissued April 23, 1878.
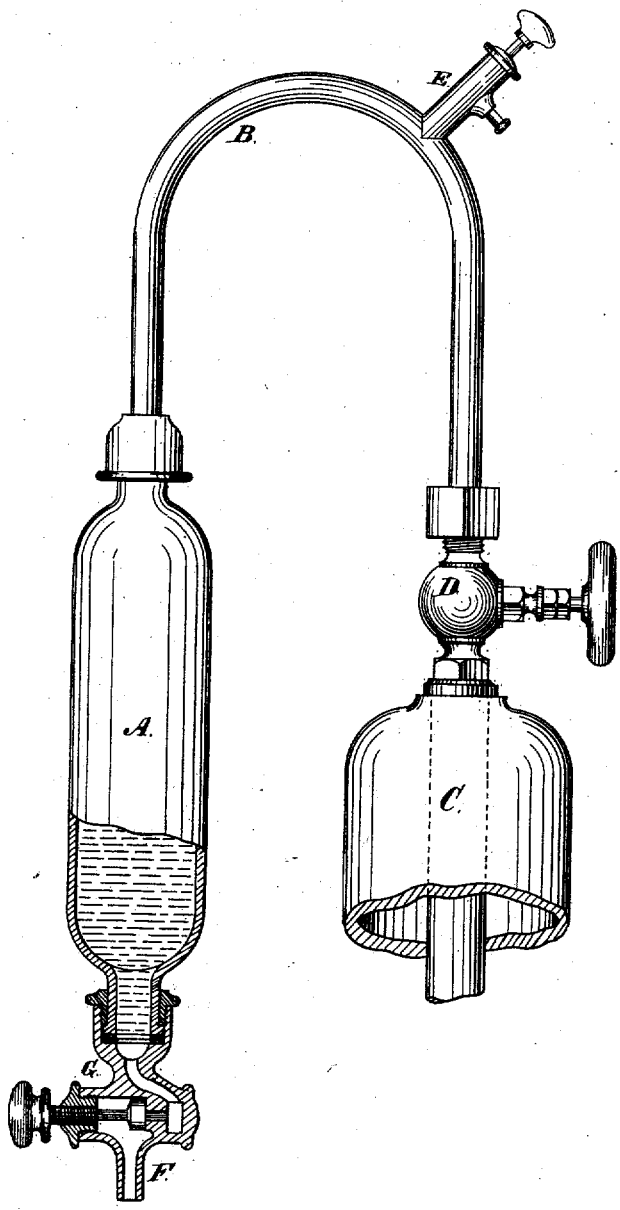
*Witnesses:*
Henry Eichling.
W Wells Jr
*Inventor:*
Thomas Warker
per James A Whitney Jr
N. PETERS, PHOTO-LITHOGRAPHER, WASHINGTON, D. C.

UNITED STATES PATENT OFFICE.

THOMAS WARKER, OF NEW YORK, N. Y.

IMPROVEMENT IN APPARATUS FOR DRAWING EFFERVESCENT LIQUIDS.

Specification forming part of Letters Patent No. 144,809, dated November 18, 1873; Reissue No. 7,113, dated May 16, 1876; Reissue No. 8,200, dated April 23, 1878; application filed March 6, 1878.

*To all whom it may concern:*

Be it known that I, THOMAS WARKER, of New York, in the State of New York, have invented a new and Improved Apparatus for Drawing Effervescent Liquids, of which the following is a specification, reference being had to the accompanying drawing, which represents a side view of my apparatus, partially in section.

This invention consists in a novel process of drawing effervescent liquids by first conducting the same into a chamber in which free or surplus gas can be let off from said liquid, and in then drawing the liquid from said chamber without subjecting said liquid to any pressure, the liquid flowing out through the discharge-spout of the chamber by its own gravity, my said process enabling the liquid thus drawn to preserve its effervescent character, inasmuch as the rapid escape of the gas from the liquid (which is indicated by foaming or frothing of the same while being withdrawn) is effectually prevented.

The invention further comprises, in an apparatus for drawing effervescent liquids, a pressure-relieving chamber, provided with an inlet passage and valve and an outlet passage and valve, in combination with the vessel or fountain from which the liquid is drawn, whereby an apparatus is provided for carrying my said process into effect.

The invention further comprises certain novel combinations of parts, whereby a very complete, and, in its details, conveniently-operated and effective apparatus is provided for carrying the principle of my said invention into effect.

A designates the pressure-relieving chamber, which is connected by a pipe, B, with a vessel or reservoir, C, that contains an effervescent liquid—such, for instance, as champagne, soda-water, or other fluid charged with gas. In this pipe B is a stop-cock, D, which controls the communication between the vessel C and the relieving-chamber A, and a valve, E, is provided to let off any pressure or free gas that may exist in the relieving-chamber. This valve E may be arranged at any convenient place between the vessel C and the relieving-chamber A, and it may be connected with the stop-cock D, so that it opens when said stop-cock is closed, and vice versa. On the bottom end of the relieving-chamber A a discharge-spout, F, is secured, which can be opened or closed by a stop-cock or valve, G, and this valve may be so arranged that it can be opened by hand, or that it opens and closes automatically, according to the position given to the relieving-chamber. The pipe B is provided with a coupling or other suitable device, so that the same can be conveniently secured to the mouth of a champagne-bottle, or to any other vessel containing an effervescent liquid.

If a portion of this liquid is to be drawn into a tumbler or other receiver, the valves E and G are closed and the stop-cock D is opened, whereby the relieving-chamber A is filled to any desired point. To effect this purpose, the vessel C must either be turned up, or the pipe B must be so arranged that it extends down into said vessel, close to its bottom, by which latter arrangement the pressure on the top of the liquid in the vessel C will force said liquid into the chamber A. After the relieving-chamber has been filled to the desired point, the stop-cock D is closed; and, by opening the valve E, the free gas in the top of the chamber A will escape, and the liquid in said chamber is relieved from all pressure; and, by opening the valve G, such liquid discharges by its inherent gravity, without producing any foaming or frothing, as the discharge of the free gas leaves the liquid without agitation, thereby preventing the same from losing its life or effervescence.

If the effervescent liquid is discharged from the vessel C under the pressure due to the free gas collected in said vessel above the liquid, the force of the discharge will produce frothing and foaming, whereby the gas, indicated by the effervescing of the liquid, will more readily escape by the force of this violent agitation during the discharge, and the liquid in the tumbler has lost its life.

By my arrangement of this intermediate chamber A, the free gas collected in the top of said chamber A is first allowed to escape when the liquid discharges itself by its inherent gravity, retaining a large portion of the gas with which it has been charged, and thus retaining its life or effervescence in the tumbler.

What I claim as new, and desire to secure by Letters Patent, is—

1. The herein-described process of drawing effervescent liquids, by first causing them to pass into a pressure-relieving chamber, where the free or surplus gas is let off from the liquid, and then drawing the said liquid without pressure and by its own gravity from said chamber, substantially as herein set forth.

2. In an apparatus for drawing effervescent liquids, the pressure-relieving chamber A, provided with an inlet passage and valve, and an outlet passage and valve, in combination with the vessel or fountain from which said liquid is supplied, all substantially as and for the purpose herein set forth.

3. The herein-described combination of a pressure-relieving chamber, constructed to permit the escape of surplus gas, and to permit the outflow of the liquid by gravity alone, and a vessel or fountain containing effervescent liquid, the said parts being provided with controlling-valves, all substantially as and for the purpose herein set forth.

4. The described combination of the pressure-relieving chamber A, having a discharge-spout, F, the gas-escape valve E, and the pipe B, having a stop-valve, D, and adapted to a vessel containing effervescent liquid, in the manner and for the purpose specified.

THOMAS WARKER.

Witnesses:
H. WELLS, Jr.
HENRY EICHLING.